Oct. 3, 1967   J. E. MANN ETAL   3,345,266
FAST NUCLEAR REACTORS
Filed Feb. 3, 1966
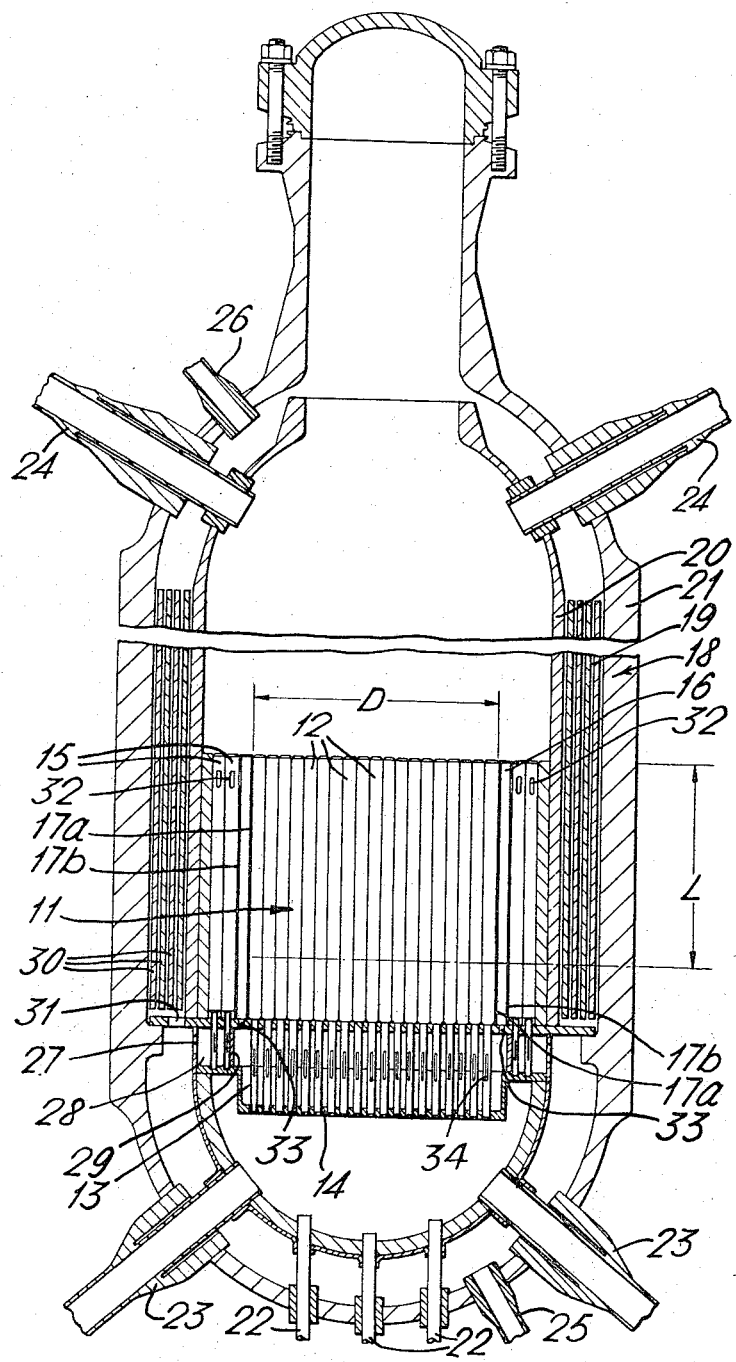

United States Patent Office 3,345,266
Patented Oct. 3, 1967

3,345,266
FAST NUCLEAR REACTORS
John Erskine Mann, Liverpool, Allan Barker, Chester, and Maurice Arthur Perks, Stockton Heath, near Warrington, England, assignors to United Kingdom Atomic Energy Authority, London, England
Filed Feb. 3, 1966, Ser. No. 524,748
Claims priority, application Great Britain, Feb. 12, 1965, 6,265/65
7 Claims. (Cl. 176—18)

ABSTRACT OF THE DISCLOSURE

A fast nuclear reactor cooled by a supercritically pressurised aqueous coolant and having a fast fuel region and an encircling radial breeder blanket region. Adjacent the interface between these two regions is a coolant gap which is devoid of fertile and fissile material. The gap is comprised of a high coolant volume fraction together with a structural volume fraction, the latter being of zirconium or a zirconium base alloy. The use of zirconium or its base alloys make a negative coolant void coefficient for the reactor more easily obtainable.

---

The present invention relates to heterogeneous fast nuclear reactors. A fast reactor has a core including a fast fuel region by which is implied the absence of any large amount of moderator and therefore the ability to sustain a fission chain reaction with a high energy neutron flux; it is to be understood herein that in the fast fuel region this reaction is sustained with a neutron flux energy spectrum having an average in excess of 1 kev.

The invention concerns in particular a fast reactor which is cooled by a supercritically pressurised aqueous coolant. Such terminology for the coolant is chosen for the reason that at supercritical pressures (above 3206 p.s.i.a.) there is no distinct phase change from water to steam as the temperature is increased above the critical temperature (374° C.) and consequently there is uncertainty whether to call the fluid water or steam.

The moderating property of an aqueous coolant introduced into a fast reactor degrades or softens the neutron energy spectrum. The softer spectrum increases non-productive capture of neutrons relative to fission in the fuel and decreases both the amount of fission in fertile isotopes, such as $U^{238}$, and the average number of neutrons generated per fission. In the event of the coolant density becoming less than corresponds to normal operation by virtue of a temperature increase, the spectrum becomes harder and the aforementioned factors become correspondingly less effective with a consequent gain in neutron population. This gain in population counteracts the increasing leakage of neutrons from the core which occurs as the coolant density is reduced. Thus not only is there a lesser margin of reactivity reduction on coolant loss in small cores where leakage is dominant, but in larger cores where leakage plays a smaller part there may even be a reactivity gain. Although the occurrence of loss of coolant in practice may be considered most unlikely, it is a general requirement for reactors to be safe in these circumstances. Put shortly, the reactor should have a negative coolant void coefficient.

In co-pending application No. 396,193, now abandoned, and in the continuation application Ser. No. 584,006, filed Oct. 3, 1966, the proposal has already been made for a fast reactor cooled by supercritically pressurised aqueous coolant that over substantially the full extent of a radial periphery of the core there is a zone of separation from a surrounding breeder blanket which zone is characterised by a high coolant volume fraction. Preferably this zone of separation is entirely free of fissile and fertile material and for brevity is aptly referred to as a coolant gap.

The present invention is based on providing in association with a coolant gap as previously referred to a material in which parasitic neutron capture is not greatly reduced on hardening of the normal operating neutron flux spectrum. This material may also reflect neutrons with less degradation of neutron energy than the coolant and so lead to a saving in the critical mass of the fast fuel region. By virtue of the non-reducing capture stipulation, such material will not add to any great extent to the flux in the gap when the spectrum hardens on coolant voiding; a marked increase on account of decreased capture in the material could heavily offset the loss of neutron by leakage from the gap and the invention therefore avoids such possibility and leaves the effectiveness of the gap substantially unimpaired.

Having regard to compatability with the coolant, the metal zirconium best meets the non-reducing capture stipulation. Thus, in accordance with the invention, a fast nuclear reactor cooled by supercritically pressurised aqueous coolant comprises a fast fuel region, an encircling region having a higher proportion of fertile to fissile material, and a zone extending substantially uninterruptedly adjacent the interface of the regions which zone has a coolant volume fraction greater than either of the regions and a significant further volume fraction constituted by metal which, at least predominantly, is zirconium. Preferably the zone is devoid of fissile and fertile material so that the complement of the coolant fraction is a structural fraction, preferably one represented substantially entirely by zirconium or zirconium base alloy. By virtue of the leakage controlling function of the zone or coolant gap, the reader should infer a thickness exceeding the neutron mean free path in coolant of average gap density for the neutron energy spectrum prevailing in the fast fuel region during normal operation. Assuming the density to be 0.8 gm./cc. the mean free path is about 1¾ cm.

Another preferred feature of the invention is that the structural volume fraction of the encircling region of high fertile content is largely of zirconium or zirconium base alloy. As compared with steel, which otherwise would probably be a first choice, the parasitic capture of neutrons is thereby reduced with consequent gain in breeding ratio, bearing in mind that the flux reaching the region in question has been softened considerably by the coolant in the gap.

A suitable coolant flow arrangement is one in which the high coolant fraction zone and the region of high fertile content are respectively in separate coolant passes through which a portion of the coolant feed is diverted in series before rejoining the remainder for flow in one or more passes through the fast fuel region. Preferably the zone pass succeeds the pass through the region of high fertile content in order to afford a better guarantee that the coolant density in the zone is a function of the instantaneous power output of the fast fuel region, this being a feature of particular importance for control of the reactor.

In the particular embodiment of the invention which is illustrated in longitudinal section in the accompanying drawing, the core indicated generally 11 of a fast reactor for cooling by supercritically pressurized aqueous coolant is of generally right cylindrical shape with a length to diameter ratio (including breeder blanket) of approximately 0.6. Sheathed plates in accordance with co-pending application No. 484,963, now patent 3,322,645, issued May 30, 1967, and containing as fast fuel a mixture of the dioxides of uranium and plutonium are to be understood to be packed together upright in elongated casings 12 which have open upper ends and extensions at their lower ends forming hollow spikes 13 fitted into sockets of a supporting grid structure 14. The fuelled length L of the plates, which is the length considered in the ratio of 0.6 referred to above, is only part of the overall plate length, the remainder being unfilled so as to provide voidage inside the plates at their lower ends to act as a reservoir for receiving fission product gases liberated by the fuel. The grid structure 14 supports the fuel assembly casings 12 in closely packed relationship to form a fast fuel region having a coolant volume fraction of about 22%, the diameter of this region being indicated by the dimension D.

A radial blanket region encircling the fast fuel region is constituted by a double row of breeder assembly casings 15 in which there are upright arrays of sheathed pins of natural uranium dioxide giving a coolant volume fraction which is also about 22%.

Between the fast fuel region and the radial blanket region there is an annular zone 16 formed by inner and outer substantially cylindrical walls 17a and 17b. The width of the zone including the walls is 3 inches and the wall thickness is such as to give a coolant volume fraction of about 90%. The walls are of a zirconium base alloy, such as Zircaloy 2 or Zr–2½% Nb and therefore the complementary structural volume fraction is entirely of zirconium base alloy.

Only those parts are shown in the drawing which are significant for the description of the present invention and its is thought sufficient to point out with regard to the housing of the core 11 that a vessel 18 in which it is disposed is double-walled with an interspace 19 between the inner wall 20 and outer wall 21, this outer wall being penetrated by control rod entry thimbles 22 and inlet and outlet nozzles 23 and 24 respectively, all of which open into the inside of the inner wall 20. Auxiliary inlet nozzles 25 and 26 also penetrate the outer wall at top and bottom of the vessel but only open into the interspace 19.

For obtaining requisite neutron leakage control by means of coolant in the annular zone 16, the density of this coolant should be high and therefore its temperature at least subcritical. Assuming that the reactor is used on a direct cycle, a minor portion of the coolant feed tapped off intermediate the feed pump and feed heaters of a typical steam turbine plant, and therefore at relatively low temperature and high density, is arranged to be passed in sufficient quantity in a first pass through the breeder assembly casings 15 to give, in making a second pass through the annular zone 16, an average density in this zone of about 0.8 gm./cc. In order to conduct such high density coolant through the breeder assembly casings and the annular zone, such coolant is supplied through the auxiliary inlet nozzles 25 and 26 to the interspace 19 between the inner and outer vessel walls 20, 21. Through ports 27 in the inner wall 20, the high density coolant stream is able to flow from the interspace into a compartment 28 separated from the remainder of the interior of the grid structure 14 by an annular partition 29. In passing to the ports 27 from the auxiliary inlet nozzles 25, 26 the high density coolant has a cooling effect on the inner and outer vessel walls and acts in conjunction with steel shielding slabs indicated diagrammatically at 30 to form a shield against damage of the outer wall by neutrons from the core, there being a series of ports, such as 31, to allow flow in the interspace 19 from one side to the other of the grid structure 14. From the compartment 28 the high density coolant can enter the breeder assembly casings 15 through which it makes a first upward pass. At their upper ends, the casings 15, unlike the fuel assembly casings 12, are closed but adjacent these ends there are slots 32 which register with one another and with corresponding slots through the outer wall 17b of the annular zone 16 so that the high density coolant then enters the zone by cross flow through the slots and executes a downward second pass between the inner and outer walls 17a, 17b of the annular zone. Further ports 33 in the grid structure 14 enable the high density coolant to discharge from the annular zone into the main interior space of the grid structure and from here the high density coolant can pass through slots 34 in the spikes 13 of the fuel assembly casings 12 to rejoin and mix with the main coolant feed which is admitted in fully preheated condition through the inlet nozzles 23 and passes into the assemblies through bottom open ends of the spikes. The combined flow makes a single upward pass through the fast fuel region represented by the fuel assembly casings 12 to achieve coolant outlet conditions of 3,500 p.s.i.a. and 565° C., this outlet coolant being discharged from the vessel through the outlet nozzles 24.

Calculations carried out for a 1,000 mw.(e) size of this embodiment using light water for the coolant indicate that the coolant void coefficient is negative, as is also the reactivity on "flooding," that is to say, increase of the coolant density throughout to the maximum of 1 gm./cc. This latter negative change is achieved without the addition of epithermal poison in the core and is largely due to the low coolant fraction in the fast fuel region. If, as is preferred, the sheathing of the pins in the breeder assembly casings is also of zirconium base alloy, an overall breeding ratio (i.e. number of plutonium atoms formed to the number destroyed) of 1.36 is obtainable. With axial breeder also accounted for, this figure would be even higher. Although mention has been made so far only of light water for the coolant, the invention is also applicable where use is made of heavy water or a mixture of the two.

An expedient to ease power peaking at the periphery of the fast fuel region is the arrangement of a thin layer of low fissile content fuel between the annular zone and the fast fuel region periphery; the lowering of fissile content may be achieved without affecting the coolant volume fraction by the replacement of fissile material with either an inert diluent, such as magnesia, or extra fertile material. In the case of the latter alternative the low fissile layer may be regarded as part of the radial breeder blanket (the region of high fertile content). The annular zone does not then lie exactly at the interface of the regions although it is still close enough to be properly referred to as adjacent the interface. Some reduction of the breeding ratio may result; typically, the figure corresponding to the one previously mentioned would be 1.25.

What we claim is:

1. A fast nuclear reactor cooled by supercritically pressurised aqueous coolant and comprising a fast fuel region, an encircling region having a higher proportion of fertile to fissile material, and a zone extending substantially uninterruptedly adjacent the interface of the regions which zone has a coolant volume fraction greater than either of the regions and a significant further volume fraction constituted by metal which, at least predominantly, is zirconium.

2. A fast nuclear reactor according to claim 1, wherein the zone is devoid of fertile and fissile material, the complement of the coolant volume fraction being a structural volume fraction which is substantially entirely of zirconium or zirconium base alloy.

3. A fast nuclear reactor according to claim 2, wherein the structural volume fraction of the encircling region of high fertile content is also substantially entirely of zirconium or zirconium base alloy.

4. A fast nuclear reactor according to claim 1, wherein the high coolant fraction zone and the region of high fertile content are in separate coolant passes through which a portion of the coolant feed to the reactor is diverted in series before rejoining the remainder of the feed for flow in at least one pass through the fast fuel region.

5. A fast nuclear reactor according to claim 4, wherein the zone pass succeeds the pass through the region of high fertile content.

6. A fast nuclear reactor according to claim 4, wherein the coolant feed portion is derived upstream of feed heaters thereby to be at a temperature less than that of the remainder of the feed as supplied direct to the fast fuel region.

7. A fast nuclear reactor according to claim 6, wherein the feed heaters are arranged to receive coolant at a sub-critical temperature whereby the coolant feed portion as supplied for the passes through the zone and high fertile content region is also at sub-critical temperature.

References Cited

UNITED STATES PATENTS 3,140,237   7/1964   Peterson et al. _____ 176—18

REUBEN EPSTEIN, *Primary Examiner.*